US010121144B2

(12) United States Patent
Khan

(10) Patent No.: US 10,121,144 B2
(45) Date of Patent: Nov. 6, 2018

(54) USING BIOMETRIC AUTHENTICATION FOR NFC-BASED PAYMENTS

(71) Applicant: Apple Inc., Cupertino, CA (US)

(72) Inventor: Ahmer A. Khan, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 724 days.

(21) Appl. No.: 14/474,803

(22) Filed: Sep. 2, 2014

(65) Prior Publication Data

US 2015/0127549 A1   May 7, 2015

Related U.S. Application Data

(60) Provisional application No. 61/899,734, filed on Nov. 4, 2013.

(51) Int. Cl.
*G06Q 20/38* (2012.01)
*G06Q 20/20* (2012.01)
(Continued)

(52) U.S. Cl.
CPC ......... *G06Q 20/3829* (2013.01); *G06Q 20/20* (2013.01); *G06Q 20/32* (2013.01);
(Continued)

(58) Field of Classification Search
None
See application file for complete search history.

(56) References Cited

U.S. PATENT DOCUMENTS

| 7,900,200 | B1 | 3/2011 | Violleau et al. |
| 8,196,131 | B1 | 6/2012 | von Behren et al. |

(Continued)

FOREIGN PATENT DOCUMENTS

| JP | 2004-506361 A | 2/2004 |
| JP | 2010-55332 A | 3/2010 |

(Continued)

OTHER PUBLICATIONS

*GlobalPlatform Card Secure Element Configuration*, Version 1.0, Member Release, Document Reference: GPC_GUI_049, GlobalPlatform, Inc., 62 pages (Oct. 2012).

(Continued)

*Primary Examiner* — Steven S Kim
*Assistant Examiner* — Timothy Paul Sax
(74) *Attorney, Agent, or Firm* — Sterne, Kessler, Goldstein & Fox P.L.L.C.

(57) ABSTRACT

In order to validate a user to facilitate conducting a high-valued financial transaction via wireless communication between an electronic device (such as a smartphone) and another electronic device (such as a point-of-sale terminal), the electronic device may authenticate the user prior to the onset of the high-valued financial transaction. In particular, a secure enclave processor in a processor may provide local validation information that is specific to the electronic device to a secure element in the electronic device when received local authentication information that is specific to the electronic device (such as a biometric identifier of the user) matches stored authentication information. Moreover, an authentication applet in the secure element may provide the local validation information to an activated payment applet in the secure element. This may enable the payment applet to conduct the high-valued financial transaction via wireless communication, such as near-field communication.

19 Claims, 7 Drawing Sheets

(51) Int. Cl.
*G06Q 20/32* (2012.01)
*G06Q 20/40* (2012.01)

(52) U.S. Cl.
CPC ..... *G06Q 20/3227* (2013.01); *G06Q 20/3278* (2013.01); *G06Q 20/40145* (2013.01)

(56) References Cited

U.S. PATENT DOCUMENTS

| | | | | |
|---|---|---|---|---|
| 8,904,195 | B1* | 12/2014 | Rahat | H04W 12/04 713/194 |
| 2002/0016913 | A1 | 2/2002 | Wheeler | |
| 2007/0156436 | A1* | 7/2007 | Fisher | G06Q 20/102 455/552.1 |
| 2008/0147508 | A1 | 6/2008 | Liu et al. | |
| 2009/0100265 | A1* | 4/2009 | Tadokoro | G07C 9/00087 713/172 |
| 2009/0106824 | A1 | 4/2009 | Morel et al. | |
| 2010/0024016 | A1 | 1/2010 | Violleau et al. | |
| 2010/0088518 | A1 | 4/2010 | Dottax et al. | |
| 2010/0258625 | A1* | 10/2010 | Stanfield | G06Q 20/24 235/380 |
| 2011/0078081 | A1* | 3/2011 | Pirzadeh | G06Q 20/20 705/44 |
| 2011/0195748 | A1* | 8/2011 | Main | G06Q 20/20 455/557 |
| 2011/0306318 | A1 | 12/2011 | Rodgers et al. | |
| 2012/0089520 | A1 | 4/2012 | Mardikar | |
| 2012/0149327 | A1 | 6/2012 | Raboisson et al. | |
| 2013/0040563 | A1 | 2/2013 | Kim et al. | |
| 2014/0244513 | A1* | 8/2014 | Ballesteros | G06Q 20/382 705/64 |
| 2015/0127550 | A1 | 5/2015 | Khan | |

FOREIGN PATENT DOCUMENTS

| | | |
|---|---|---|
| JP | 2012-123807 A | 6/2012 |
| JP | 2012-530961 A | 12/2012 |
| JP | 2013-535142 A | 9/2013 |
| KR | 10-2008-0113072 | 12/2008 |
| KR | 10-2011-0042250 | 4/2011 |
| KR | 10-2013-0017507 | 2/2013 |
| WO | WO 2008/117999 A1 | 10/2008 |
| WO | WO 2011/078855 A1 | 6/2011 |

OTHER PUBLICATIONS

*GlobalPlatform Card UICC Configuration,* Version 1.0.1, Member Release, Document Reference: GPC_GUI_010, GlobalPlatform, Inc., 137 pages (Jan. 2011).
*GlobalPlatform Card Confidential Card Content Management Card Specification v2.2—Amendment A,* Version 1.0.1, Public Release, Document Reference: GPC_SPE_007, GlobalPlatform, Inc., 26 pages (Jan. 2011).
*GlobalPlatform Card Contactless Services Card Specification v2.2—Amendment C,* Version 1.1, Public Release, Document Reference: GPC_SPE_025, GlobalPlatform, Inc., 125 pages (Apr. 2013).
*GlobalPlatform Card Security Upgrade for Card Content Management Card Specification v2.2—Amendment E,* Version 1.0. Public Release, Document Reference: GPC_SPE_042, GlobalPlatform, Inc., 35 pages (Nov. 2011).
*NFC Secure Element Stepping Stones,* Version 1.0, simalliance, 75 pages (Jul. 2013).
*Security of Proximity Mobile Payments,* Publication No. CPMC-09001, Smart Card Alliance, 39 pages (May 2009).
English-language abstract for JP Patent Publication No. 2010-55332A, published Mar. 11, 2008, printed from https://worldwide.espacenet.com, 2 pages.
English-language abstract for JP Patent Publication No. 2012-123807A, published Jun. 28, 2012, printed from https://worldwide.espacenet.com, 2 pages.
*EMV Mobile Contactless Payment,* Technical Issues and Position Paper, Version 1.0, EMVCo, LLC, pp. 1-27 (Oct. 2007).
English-language abstract for KR Patent Publication. No. 10-2008-0113072, published Dec. 26, 2008, printed from https://worldwide.espacenet.com, 1 page.
English-language abstract for KR Patent Publication No. 10-2011-0042250, published Apr. 25, 2011, printed from https://worldwide.espacenet.com, 1 page.
English-language abstract for KR Patent Publication No. 10-2013-0017507, published Feb. 20, 2013, printed from https://worldwide.espacenet.com, 1 page.

* cited by examiner

USING BIOMETRIC AUTHENTICATION FOR NFC-BASED PAYMENTS

CROSS REFERENCE TO RELATED APPLICATION

This application claims priority under 35 U.S.C. § 119(e) to U.S. Provisional Application Ser. No. 61/899,734, entitled "Using Biometric Authentication for NFC-Based Payments," by Ahmer A. Khan, filed on Nov. 4, 2013, the contents of which are herein incorporated by reference.

BACKGROUND

Field

The described embodiments relate to techniques for validating financial transactions conducted by electronic devices via wireless communication.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface (such as a near-field-communication interface). Because of the popularity of these electronic devices and the convenience provided by this wireless-communication capability, there is increasing interest in using electronic devices to conduct financial transactions. For example, a so-called 'digital wallet' application executing on a cellular telephone may be used to pay for a purchase at a point-of-sale terminal.

However, security remains a concern in using wireless communication to conduct financial transactions. For example, many financial institutions (such as banks and credit-card providers) require that a user provide some form of authentication (such as a signature or a personal identification number) that confirms the user's identity before a financial transaction can be completed. However, it can be challenging to provide a secure end-to-end system to communicate this authentication information during communication within the electronic devices and between the electronic devices. In addition, many existing approaches for communicating the authentication information when conducting a financial transaction via wireless communication are cumbersome (such as requiring users to repeat the same operations multiple times), and can consequently degrade the user experience. Therefore, security issues continue to restrict the use of electronic devices to conduct financial transactions, and thus constrain associated commercial activity.

SUMMARY

The described embodiments relate to an electronic device. This electronic device includes: a secure element with a payment applet that conducts a financial transaction with another electronic device; and a processor with a secure enclave processor that securely communicates with the secure element using one or more encryption keys. Moreover, the processor compares local authentication information specific to the electronic device with stored authentication information using the secure enclave processor, and provides local validation information specific to the electronic device to the secure element via the secure enclave processor if a match is obtained between the local authentication information and the stored authentication information. This local validation information enables the payment applet to conduct the financial transaction exceeding a financial value without further validation.

In some embodiments, the local validation information is provided before an onset of the financial transaction.

Note that the payment applet may execute in an environment (such as an operating system) of the secure element.

Moreover, the electronic device may include: an antenna; and an interface circuit that communicates with the other electronic device, where the financial transaction is conducted via wireless communication. For example, the electronic device may communicate with the other electronic device via near-field communication, and the financial transaction may be initiated by positioning the electronic device proximate to the other electronic device. In some embodiments, the other electronic device includes a point-of-sale terminal that provides the financial value. In addition, the financial transaction may be conducted when the electronic device is positioned in close proximity to the other electronic device a single time.

Furthermore, the electronic device may include a biometric sensor, and the local authentication information may include a biometric identifier acquired by the biometric sensor.

In some embodiments, the local authentication information includes: a passcode for unlocking at least some functionality of the electronic device.

Additionally, the secure element may include an authentication applet that communicates the local validation information to the payment applet via a sharable interface object. This authentication applet may decrypt an encrypted token received from the secure enclave processor using an encryption key, and the token may include the local validation indicator.

In some embodiments, the electronic device includes memory that stores a program module that is executed by the processor to perform validation. In particular, the program module may include instructions for at least some of the aforementioned operations, such as: receiving the local authentication information; comparing the local authentication information with the stored authentication information using the secure enclave processor; and providing the local validation information to the secure element via the secure enclave processor and the interface circuit if a match is obtained between the local authentication information and the stored authentication information. Moreover, prior to the instructions for receiving the local authentication information, the program module may include instructions for: providing an activation command to the payment applet via the secure enclave processor and/or the interface circuit, where the payment applet may conduct the financial transaction after receiving the activation command and based on the local validation information; receiving an activation response from the payment applet via the interface circuit and/or the secure enclave processor; and requesting the local authentication information based on the activation response. Furthermore, the program module may include instructions for conducting the financial transaction after receiving information indicating that the electronic device is proximate to the other electronic device.

Another embodiment provides a computer-program product for use with the electronic device. This computer-program product includes instructions for at least some of the operations performed by the electronic device.

Another embodiment provides a method for performing the validation, which may be performed by the processor in the electronic device. During the method, the electronic device may perform at least some of the operations described above.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to validate a user to facilitate conducting a high-valued financial transaction via wireless communication between an electronic device (such as a smartphone) and another electronic device (such as a point-of-sale terminal), the electronic device may authenticate the user prior to the onset of the high-valued financial transaction. In particular, a secure enclave processor in a processor may provide local validation information that is specific to the electronic device to a secure element in the electronic device when received local authentication information that is specific to the electronic device (such as a biometric identifier of the user) matches stored authentication information. Moreover, an authentication applet in the secure element may provide the local validation information to an activated payment applet in the secure element. This may enable the payment applet to conduct the high-valued financial transaction via wireless communication, such as near-field communication.

For example, the financial transaction may be conducted between the electronic device and the other electronic device by conveying packets that are transmitted and received by radios in the electronic device and the other electronic device in accordance with a communication protocol, such as an Institute of Electrical and Electronics Engineers (IEEE) 802.11 standard, Bluetooth™ (from the Bluetooth Special Interests Group of Kirkland, Wash.), and/or another type of wireless interface, such as a near-field-communication standard or specification (from the NFC Forum of Wakefield, Mass.). In the discussion that follows, near-field communication is used as an illustrative example.

Figure 1:
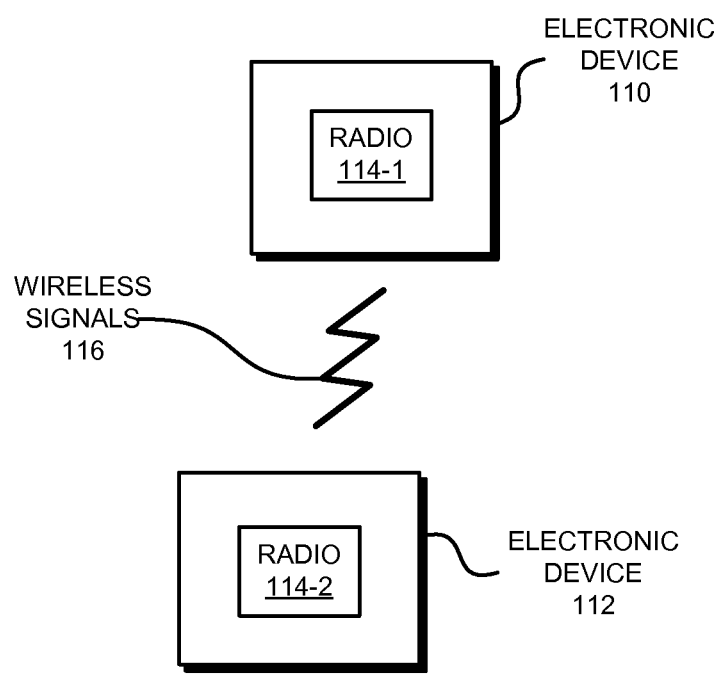
FIG. 1 is a block diagram illustrating electronic devices wirelessly communicating during a financial transaction in accordance with an embodiment of the present disclosure.

The communication between the electronic device and the other electronic device is shown in FIG. 1, which presents a block diagram illustrating electronic devices 110 and 112 wirelessly communicating during a financial transaction. In particular, these electronic devices may wirelessly communicate during a financial transaction. For example, the financial transaction may initiate when a user positions electronic device 110 (such as a cellular telephone) proximate to electronic device 112 (such as a point-of-sale terminal). Note that proximity may involve physical contact between electronic devices 110 and 112 (such as touching or tapping electronic device 110 on electronic device 112) or may be contactless (e.g., electronic device 110 may be within the radiation pattern of an antenna in electronic device 112, such as within a few inches to a foot). This wireless communication may use a radio-frequency-identification communication protocol. Thus, the wireless communication may or may not involve a connection being established between electronic devices 110 and 112, and therefore may or may not involve communication via a wireless network (such as a cellular-telephone network).

In response to detecting that electronic device 110 is proximate to electronic device 112, electronic device 112 may provide information about the financial transaction (such as items being purchased, an amount due, a financial threshold above which validation is required in order to conduct the financial transaction, etc.). In addition, electronic device 112 may request payment information (such as credit- or debit-card data or information and, more generally, information associated with a financial vehicle) from electronic device 110. When this request is received, electronic device 110 may provide the payment information. This back-and-forth handshaking may continue until the financial transaction is complete.

The wireless communication between electronic devices 110 and 112 may involve the exchange of packets that include the information about the financial transaction, the payment information, etc. These packets may be included in frames in one or more wireless channels.

As described further below with reference to FIG. 2, electronic devices 110 and 112 may include subsystems, such as: a networking subsystem, a memory subsystem, a processor subsystem and a secure subsystem. In addition, electronic devices 110 and 112 may include radios 114 in the networking subsystems. More generally, electronic devices 110 and 112 can include (or can be included within) any electronic devices with the networking subsystems that enable electronic devices 110 and 112 to wirelessly communicate with another electronic device. This can comprise transmitting frames on wireless channels to enable electronic devices to make initial contact, followed by exchanging subsequent data/management frames (such as connect requests to establish a connection), configuring security options (e.g., IPSEC), transmitting and receiving packets or frames, etc.

As can be seen in FIG. 1, wireless signals 116 (represented by a jagged line) are transmitted from a radio 114-1 in electronic device 110. These wireless signals 116 are received by radio 114-2 in electronic device 112.

In the described embodiments, processing a packet or frame in either of electronic devices 110 and 112 includes: receiving wireless signals 116 with the packet or frame;

decoding/extracting the packet or frame from received wireless signals 116 to acquire the packet or frame; and processing the packet or frame to determine information contained in the packet or frame (such as the information about the financial transaction, the payment information, etc.).

Although we describe the environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of the electronic device. FIG. 2 presents a block diagram illustrating electronic device 110. This electronic device includes processing subsystem 210, memory subsystem 212, networking subsystem 214, authentication subsystem 216 and secure subsystem 218. Processing subsystem 210 includes one or more devices (e.g., 211a, 211b) configured to perform computational operations. For example, processing subsystem 210 can include one or more microprocessors, application-specific integrated circuits (ASICs), microcontrollers, programmable-logic devices, and/or one or more digital signal processors (DSPs).

In addition, processing subsystem 210 may include a secure enclave processor 220 (which is a system-on-chip within one or more processors 211 (e.g., 211a) in processing subsystem 210) that performs security services for other components in the processing subsystem 210 and that that securely communicates with other subsystems in electronic device 110. Secure enclave processor 220 may include one or more processors, a secure boot ROM, one or more security peripherals, and/or other components. The security peripherals may be hardware configured to assist in the secure services performed by secure enclave processor 220. For example, the security peripherals may include: authentication hardware implementing various authentication techniques, encryption hardware configured to perform encryption, secure-interface controllers configured to communicate over the secure interface to other components, and/or other components. In some embodiments, instructions executable by secure enclave processor 220 are stored in a trust zone in memory subsystem 212 that is assigned to secure enclave processor 220, and secure enclave processor 220 fetches the instructions from the trust zone for execution. Secure enclave processor 220 may be isolated from the rest of processing subsystem 210 except for a carefully controlled interface, thus forming a secure enclave for secure enclave processor 220 and its components. Because the interface to secure enclave processor 220 is carefully controlled, direct access to components within secure enclave processor 220 (such as a processor or a secure boot ROM) may be prevented. In some embodiments, secure enclave processor 220 encrypts and/or decrypts authentication information communicated with authentication subsystem 216, and encrypts and/or decrypts information (such as tokens) communicated with secure subsystem 218. Furthermore, secure enclave processor 220 may compare authentication information with stored authentication and, if a match is obtained, may provide an encrypted token with an authentication-complete indicator to a secure element 230.

Memory subsystem 212 includes one or more devices for storing data and/or instructions for processing subsystem 210, networking subsystem 214, authentication subsystem 216 and/or secure subsystem 218. For example, memory subsystem 212 can include dynamic random access memory (DRAM), static random access memory (SRAM), and/or other types of memory. In some embodiments, instructions for processing subsystem 210 in memory subsystem 212 include: one or more program modules or sets of instructions (such as program module 246, e.g., a digital wallet, a passbook and/or a mobile payments application), which may be executed by processing subsystem 210. Note that the one or more computer programs may constitute a computer-program mechanism. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in electronic device 110. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 110 as fast-access storage for often-used data, while the mass-storage device is used to store less frequently used data.

Networking subsystem 214 includes one or more devices configured to couple to and communicate on a wired and/or wireless network (i.e., to perform network operations), including an interface circuit 222 (such as a near-field-communication circuit) and an antenna 224. For example, networking subsystem 214 can include a Bluetooth™ networking system, a cellular networking system (e.g., a 5G/4G network such as UMTS, LTE, etc.), a universal serial bus (USB) networking system, a networking system based on the standards described in IEEE 802.11 (e.g., a Wi-Fi networking system), an Ethernet networking system, and/or another communication system (such as a near-field-communication system).

Networking subsystem 214 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 110 may use the mechanisms in networking subsystem 214 for performing simple wireless communication between electronic devices 110 and 112 (FIG. 1), e.g., transmitting advertising frames and/or near-field communication as described previously.

Authentication subsystem 216 may include one or more processors, controllers and devices for receiving the authentication information from a user of electronic device 110, and for securely communicating this authentication information to processor subsystem 210 (such as by encrypting the authentication information). For example, the authentication information may include: a biometric identifier acquired by a biometric sensor 226 (such as: a fingerprint sensor, a retinal sensor, a palm sensor, a signature-identification sensor, etc.); a personal identification number (PIN) associated with one of payment applets 236 that is received using a user-interface device 228 (such as a keypad, a touch-sensitive display, optical character recognition and/or voice recognition); and a passcode for unlocking at least some functionality of electronic device 110 that is received using user-interface device 228.

Furthermore, secure subsystem 218 may include a secure element 230, which includes one or more processors and memory. Note that secure element 230 may be a tamper-resistant component that is used in electronic device 110 to provide the security, confidentiality, and multiple application environments required to support various business models. Secure element 230 may exist in one or more of a variety of form factors, such as: a universal integrated circuit card (UICC), an embedded secure element (on a circuit board in electronic device 110), a smart secure digital (SD) card, a smart microSD card, etc.

Moreover, secure element 230 may include one or more applets or applications that execute in an environment of secure element 230 (such as in the operating system of secure element 230, and/or in a Java runtime environment executing on the secure element 230). For example, the one or more applets may include an authentication applet 232 that: performs contactless registry services, encrypts/decrypts packets or tokens communicated with secure enclave processor 220, sets one or more software flags (such as an authentication-complete flag 234) in an operating system of secure element 230, and/or conveys information to one or more payment applets 236 via sharable interface objects. (While a sharable interface object is used as an illustrative example in the present discussion, in other embodiments different mechanisms may be used, such as global services, remote method invocation (RMI), etc.) In addition, the one or more applets may include one or more payment applets 236 that conduct financial transactions with electronic device 112 (FIG. 1) when they are activated by program module 246, and based on the one or more software flags and/or when electronic device 110 is proximate to electronic device 112 (FIG. 1).

Authentication applet 232 may execute in a master or issuer security domain in secure element 230, while payment applets 236 may execute in supplemental security domains. Communication between these security domains may be encrypted using different encryption/decryption keys that are security-domain specific. In electronic device 110, and during communication between electronic devices 110 and 112 (FIG. 1), encryption/decryption may involve symmetric and/or asymmetric encryption. In addition, the information communicated may also include a digital signature that is specific to electronic device 110 and/or components in electronic device 110.

Figure 3:
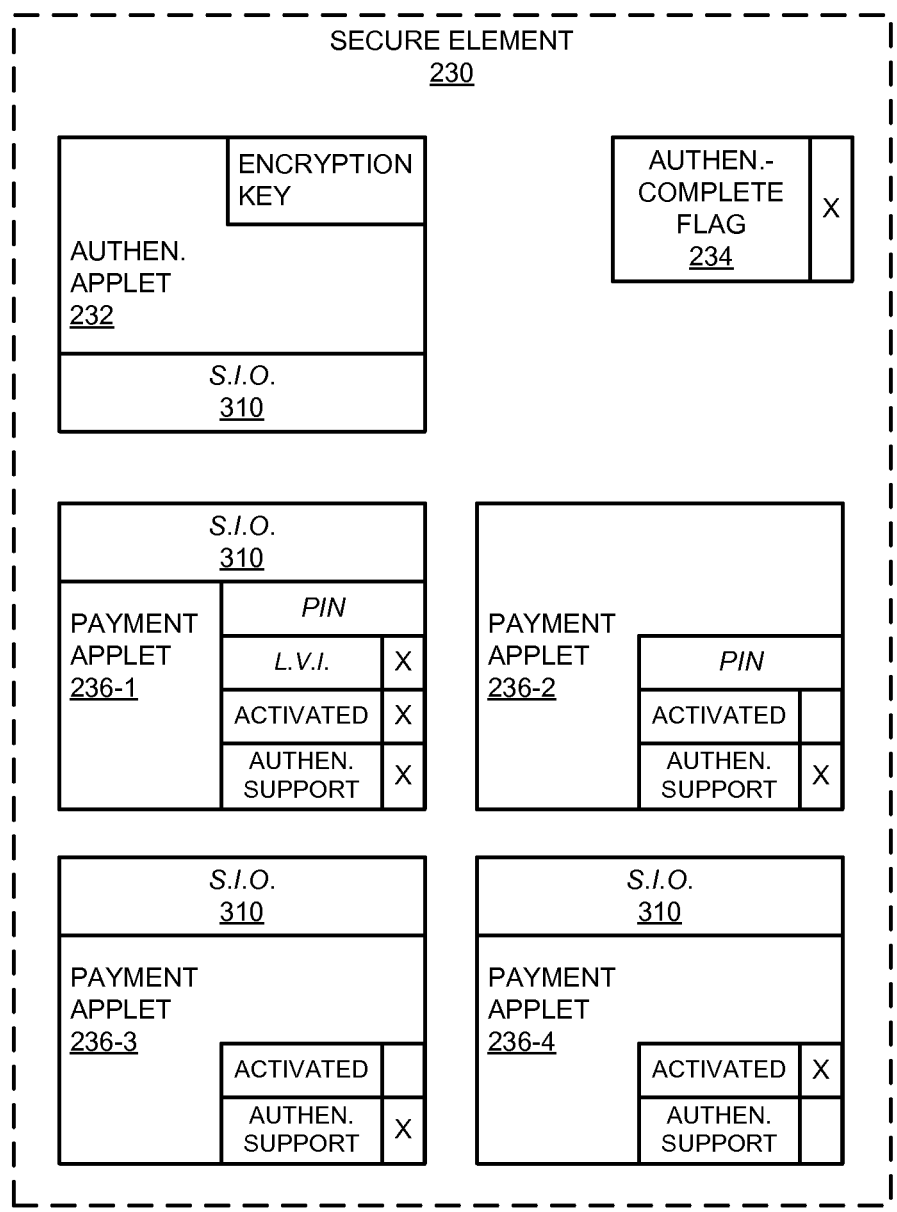
FIG. 3 is a block diagram illustrating the secure element in the electronic device in FIG. 2 in accordance with an embodiment of the present disclosure.

The data stored in secure element 230 is further illustrated in FIG. 3. In particular, for each of payment applets 236, secure element 230 may store: whether a given payment applet is active (in response to an activation command); and whether or not authentication-complete flag 234 is supported by/applies to the given payment applet. In some embodiments there are one or more payment applets (such as payment applet 236-4) for which authentication-complete flag 234 does not apply. In some embodiments, secure element 230 stores, for at least for one of payment applets 236, a PIN that is associated with this payment applet. For example, as shown in FIG. 3, payment applets 236-1 and 236-2 may store associated PINs.

As discussed further below, the user may use passbook 248 (FIG. 2) to select or activate one or more of payment applets 236 (such as payment applets 236-1 and 236-4). If payment applet 236-1 supports authentication-complete flag 234 (as indicated by enabling or setting of authentication support in payment applet 236-1), in order for payment applet 236-1 to conduct a financial transaction with electronic device 112 (FIG. 1), payment applet 236-1 may need to be activated and authentication-complete flag 234 may need to be set or enabled in secure element 230 (indicating that the user has been authenticated). In contrast, for payment applet 236-4, which does not support authentication-complete flag 234 (as indicated by disabling of authentication support in payment applet 236-1), a financial transaction may be conducted when payment applet 236-4 is active (i.e., operation of payment applet 236-4 is not gated by setting or enabling of authentication-complete flag 234 in secure element 230). While the present discussion illustrates the use of a global authentication-complete flag 234, note that in some embodiments there are separate authentication-complete flags associated with at least some of the payment applets 236 (i.e., there may be a specific authentication-complete flag for payment applet 236-1, etc.). Alternatively or additionally, in some embodiments in which a user is conducting a high-valued financial transaction, authentication applet 232 may communicate local validation information (L.V.I.) to one or more of payment applets 236 (such as payment applet 236-1) via sharable interface object (S.I.O.) 310.

Within electronic device 110, processing subsystem 210, memory subsystem 212, networking subsystem 214, authentication subsystem 216 and secure subsystem 218 may be coupled together using one or more interconnects, such as bus 238. These interconnects may include an electrical, optical, and/or electro-optical connection that the subsystems can use to communicate commands and data among one another. Note that different embodiments can include a different number or configuration of electrical, optical, and/or electro-optical connections between the subsystems. In some embodiments, electronic device 110 can detect tampering with secure components (such as secure enclave processor 220, secure element 230 and/or bus 238) and may destroy encryption/decryption keys or authentication information (such as a stored biometric identifier) if tampering is detected.

In some embodiments, the electronic device includes a display subsystem 240 for displaying information on a display, which may include a display driver and the display, such as a liquid-crystal display, a multi-touch touchscreen, etc. In addition, in some embodiments the electronic device includes a secure input/output (I/O) subsystem 242 (such as a keypad) for receiving the PIN of the user that is associated with one of payment applets 236. As noted previously, display subsystem 240 and/or secure I/O subsystem 242 may be included in authentication subsystem 216.

Electronic device 110 can be (or can be included in) any electronic device with at least one network interface. For example, electronic device 110 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 110, in alternative embodiments, different components and/or subsystems may be present in electronic device 110. For example, electronic device 110 may include one or more additional processing subsystems, memory subsystems, networking subsystems, authentication subsystems, secure subsystems, display subsystems and/or secure I/O subsystems. Additionally, one or more of the subsystems may not be present in electronic device 110. Moreover, in some embodiments, electronic device 110 may include one or more additional subsystems that are not shown in FIG. 2. For example, electronic device 110 can include, but is not limited to, a data collection subsystem, an audio and/or video subsystem, an alarm subsystem, and/or a media processing subsystem. Also, although separate subsystems are shown in FIG. 2, in some embodiments, some or all of a given subsystem or component can be integrated into one or more of the other subsystems or components in electronic device 110. For example, in some embodiments program module 246 is included in operating system 244. Alternatively or additionally, at least some of the functionality of program module 246 may be included in passbook 248.

Moreover, the circuits and components in electronic device 110 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214 (such as a radio) and, more generally, some or all of the functionality of electronic device 110. Moreover, the integrated circuit may include hardware and/or software mechanisms that are used for transmitting wireless signals from electronic device 110 and receiving signals at electronic device 110 from electronic device 112 (FIG. 1). Aside from the mechanisms herein described, radios are generally known in the art and hence are not described in detail. In general, networking subsystem 214 and/or the integrated circuit can include any number of radios. Note that the radios in multiple-radio embodiments function in a similar way to the radios described in single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with a near-field communication standard or specification was used as an illustrative example, the described embodiments of the communication techniques may be used in a variety of network or communication interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Figure 4:
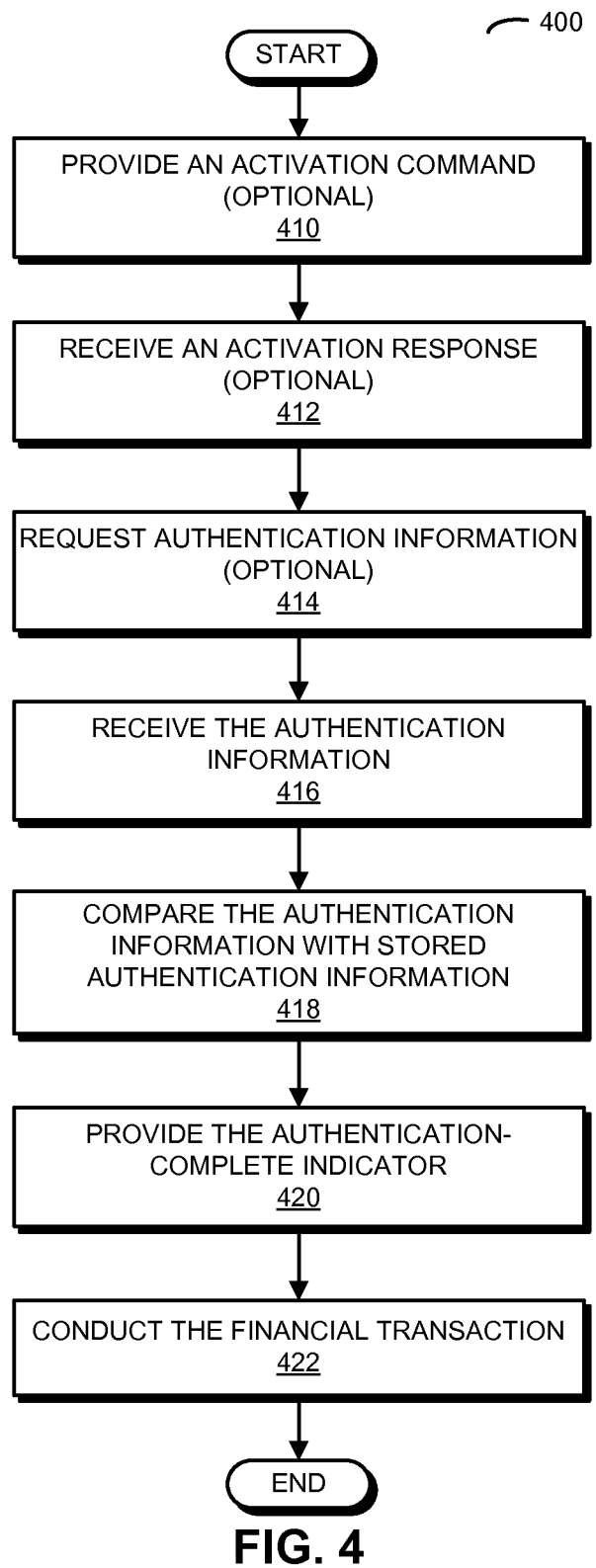
FIG. 4 is a flow diagram illustrating a method for performing authentication using one of the electronic devices in FIG. 1 in accordance with an embodiment of the present disclosure.

We now describe embodiments of the authentication technique. FIG. 4 presents a flow diagram illustrating a method 400 for performing authentication, which may be performed by a processor in an electronic device (such as electronic device 110 in FIGS. 1 and 2). During operation, the processor may optionally provide an activation command (operation 410) to a payment applet (such as one of payment applets 236 in FIG. 2) via a secure enclave processor (such as secure enclave processor 220 in FIG. 2) and/or an interface circuit (such as interface circuit 222 in FIG. 2), where the payment applet may conduct a financial transaction after receiving the activation command and based on an authentication-complete indicator. For example, a user of the electronic device may use a digital wallet/passbook application (such as passbook 248 in FIG. 2) to select one of the payment applets corresponding to a credit or a debit card for use in paying for the financial transaction, which may result in the activation command being provided to the selected payment applet. This selection may be made by activating an icon displayed on a touch-sensitive display. Alternatively or additionally, the selection may be made using a top-level button in a user interface of the electronic device. For example, the user may perform a swiping gesture in a top-level user interface in a user-interface hierarchy or tree, and then may select the payment applet from a set of possible payment applets that are displayed.

In response to the activation command, the processor may optionally receive an activation response (operation 412) from the payment applet via the interface circuit and/or the secure enclave processor.

Then, the processor may optionally request authentication information (operation 414) based on the activation response. For example, the processor may request that a biometric sensor (such as biometric sensor 226 in FIG. 2) acquire a biometric identifier (such as a fingerprint) of the user.

In response to the request, the processor may receive the authentication information (operation 416). For example, the authentication information may include the biometric identifier, which is received from the biometric sensor.

Next, the processor may compare the authentication information with stored authentication information (operation 418) using the secure enclave processor. Note that stored authentication information may be stored in the processor or the secure enclave processor. In some embodiments, a PIN associated with the payment applet is be stored with the payment applet in the secure element (e.g., there may be a pointer to a data structure in the operating system of the secure element). However, in some other embodiments, the PIN is stored in the processor after the user provides it the first time to the electronic device.

Moreover, the processor may provide the authentication-complete indicator (operation 420) to a secure element (such as secure element 230 in FIG. 2) via the secure enclave processor and/or the interface circuit if a match is obtained between the authentication information and the stored authentication information. This communication may involve secure (encrypted) communication between the secure enclave processor and the secure element.

For a payment applet that supports authentication (which may be set during installation of the payment applet in the secure element), the authentication-complete indicator may enable the activated payment applet to conduct the financial transaction. For example, an authentication applet (such as authentication applet 232 in FIG. 2) in the secure element may set an authentication-complete flag in an operating system of the secure element based on the received authentication-complete indicator. Note that in some embodiments the authentication-complete flag is stored in random access memory in the secure element. (Storing the authentication-complete flag in random-access memory may, in some instances, save power, and may also have the effect that the authentication-complete flag is cleared when the electronic device is powered off.) Furthermore, as noted previously, the authentication applet may decrypt an encrypted token received from the secure enclave processor using an encryption key, and the token may include the authentication-complete indicator.

After the payment applet is activated and the authentication-complete flag is set based on the authentication-complete indicator, the electronic device may conduct the financial transaction (operation 422) after receiving information indicating that the electronic device is proximate to another electronic device (such as electronic device 112 in FIG. 1). For example, the authentication-complete flag may be set to 'true' to enable the activated payment applet if the authentication-complete indicator indicates that a match was obtained; otherwise, the authentication-complete flag may be set to 'false' to disable the activated payment applet if this payment applet supports authentication.

While the payment applet may be gated by the activation command and the authentication-complete indicator or flag, the secure element may include a second payment applet (such as another one of payment applets 236 in FIG. 2) that conducts a second financial transaction via the interface circuit without enablement based on the authentication-complete indicator or flag. For example, the second payment applet may include a mass-transit payment applet that does not require authentication before it can be used to conduct the second financial transaction.

Figure 5:
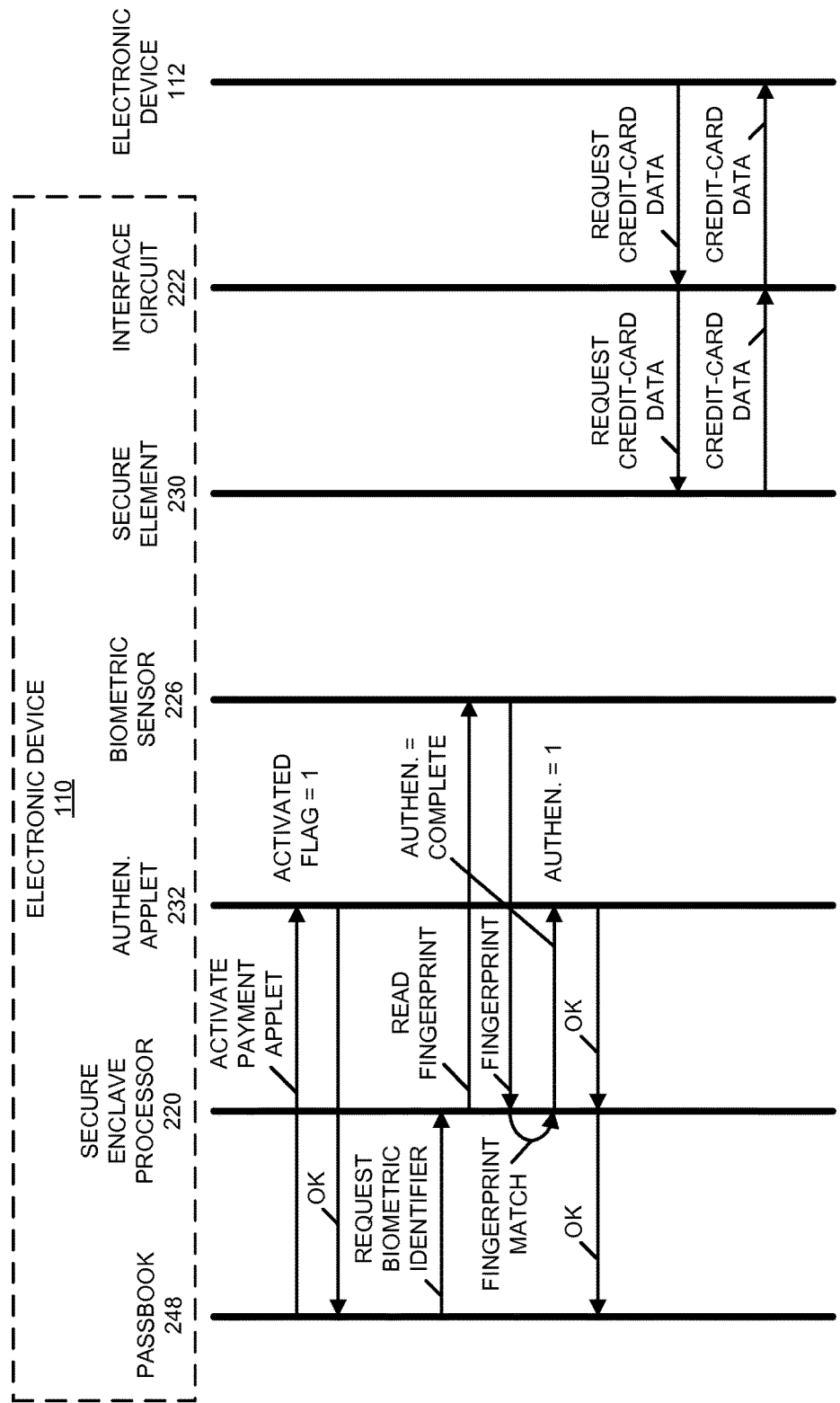
FIG. 5 is a drawing illustrating communication within one of the electronic devices in FIG. 1 and between the electronic devices of FIG. 1 in accordance with an embodiment of the present disclosure.

The handshaking in the aforementioned authentication technique is illustrated in FIG. 5, which presents a drawing illustrating communication within electronic device 110 (FIG. 1) and between electronic devices 110 and 112 (FIG. 1). Note that the operations illustrated in FIG. 5 may include challenge and response operations, which are not shown for clarity.

During the communication in FIG. 5, in response to an instruction from a user of electronic device 110, passbook 248 may provide an activation command associated with a payment applet to an authentication applet 232 in secure element 230. In response, authentication applet 232 may set an activated flag and may provide an activation response associated with the payment applet to passbook 248.

Then, passbook 248 may provide a request for a biometric identifier (and, more generally, authentication information) to secure enclave processor 220, which may request that biometric sensor 226 performs a fingerprint read. After acquiring the fingerprint of the user, biometric sensor 226 provides the fingerprint to secure enclave processor 220.

Next, secure enclave processor 220 compares the fingerprint to a stored fingerprint of the user. If a match is obtained, secure enclave processor 220 provides an authentication-complete indicator to authentication applet 232, which may set an authentication flag and may provide a response indicating that the user is authenticated to secure enclave processor 220 and, in turn, passbook 248.

Subsequently, electronic device 112 may request credit-card data associated with the now activated and authenticated payment applet via near-field communication with interface circuit 222, which communicates the request to secure element 230. In response, secure element 230 provides the credit-card data to interface circuit 222, which communicates the credit-card data via near-field communication to electronic device 112.

In these ways, the electronic device may facilitate financial transactions between electronic devices 110 and 112 (FIGS. 1 and 2) by providing end-to-end secure authentication of a user of electronic device 110 (FIG. 1). In turn, by securely authenticating the user, this authentication technique may reduce the risk of fraud or theft during the financial transactions, and may reduce the number of operations the user needs to perform to complete financial transactions. Thus, the authentication technique may reduce user frustration and may improve the user experience. Consequently, the authentication technique may increase commercial activity by making it safer and easier to conduct financial transactions using electronic devices and wireless communication.

We now describe embodiments of the validation technique. Referring back to FIG. 1, financial transactions exceeding a financial value (such as €75 or $100, or whatever the case may be) may be defined as 'high-valued financial transactions' (HVT) by a merchant or vendor. In these cases, a user of electronic device 110 may be required to be authenticated before the financial transaction can be completed. In existing financial-transaction flows, the user of electronic device 110 may bring electronic device 110 in proximity to or into contact with electronic device 112 to initiate the financial transaction. However, if the financial transaction is a high-valued financial transaction, the user may then be asked to perform authentication (e.g., the user may be asked for a PIN). Once the user has been successfully authenticated, the user may have to bring electronic device 110 in proximity to or into contact with electronic device 112 again in order to conduct the financial transaction. Performing these multiple operations is cumbersome and can be frustrating for the user, thereby degrading the user's overall experience.

Instead, as described below, during a validation technique electronic device 110 may be used to authenticate the user prior to the onset or initiation of the financial transaction. This may allow the user to subsequently initiate and conduct the financial transaction by bringing electronic device 110 in proximity to or into contact with electronic device 112 one time. Moreover, the authentication may be based on so-called 'local authentication information,' which is specific to electronic device 110 (such as a passcode or a biometric identifier), as opposed to using global authentication information (such as a PIN), which is associated with one of payment applets 236 (FIG. 2). However, in some embodiments the authentication in the validation technique is based on a PIN.

Figure 2:
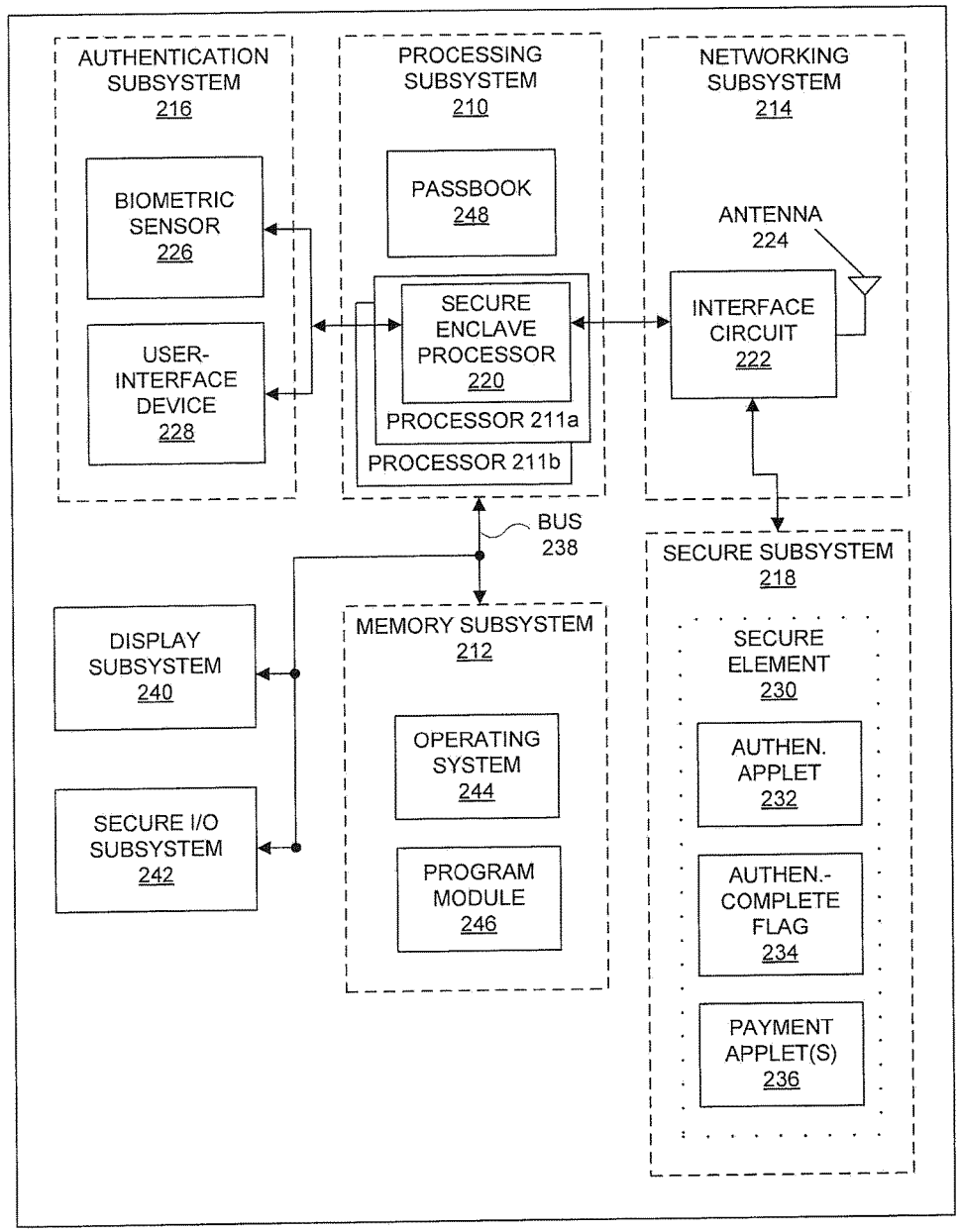
FIG. 2 is a block diagram illustrating one of the electronic devices of FIG. 1 in accordance with an embodiment of the present disclosure.
Figure 6:
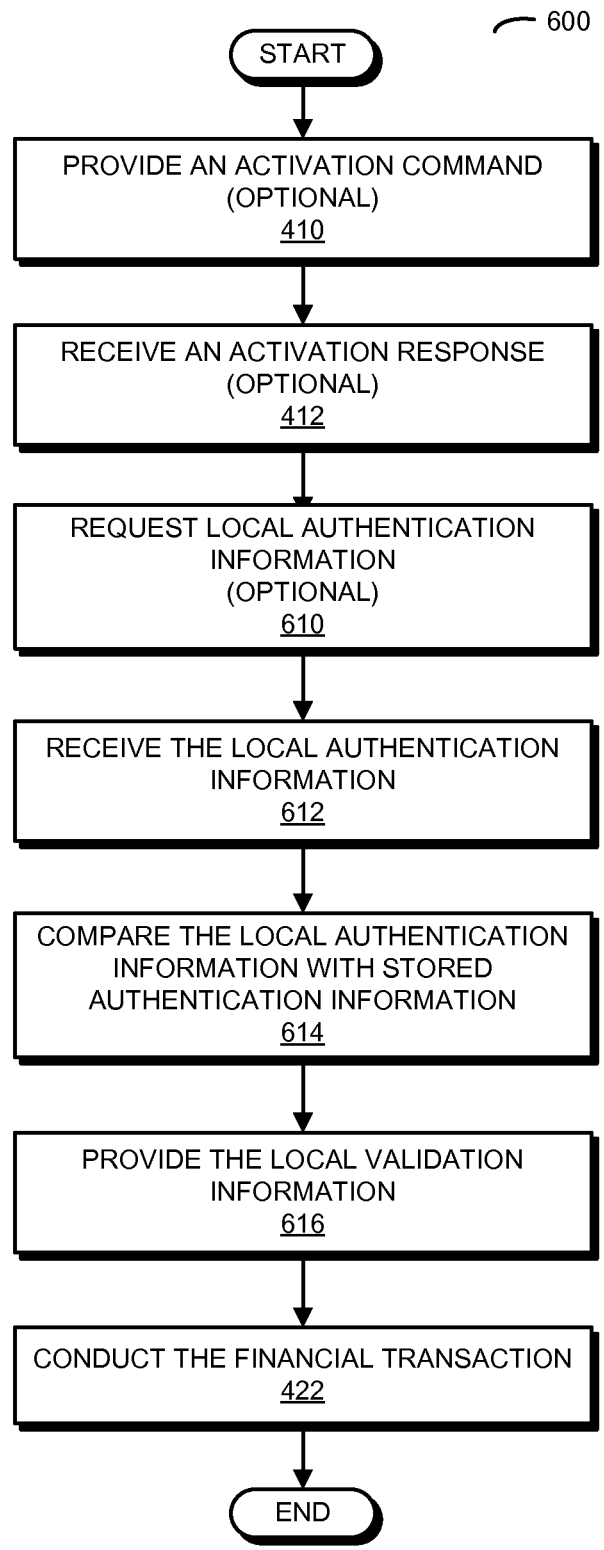
FIG. 6 is a flow diagram illustrating a method for performing validation using one of the electronic devices in FIG. 1 in accordance with an embodiment of the present disclosure.

FIG. 6 presents a flow diagram illustrating a method 600 for performing validation, which may be performed by a processor in an electronic device (such as electronic device 110 in FIGS. 1 and 2). During operation, the processor may optionally provide an activation command (operation 410) to a payment applet (such as one of payment applets 236 in FIG. 2) via a secure enclave processor (such as secure enclave processor 220 in FIG. 2) and/or an interface circuit (such as interface circuit 222 in FIG. 2), where the payment applet may conduct a high-valued financial transaction exceeding a financial value after receiving the activation command and based on local validation information. For example, a user of the electronic device may use a digital wallet/passbook application (such as passbook 248 in FIG. 2) to select one of the payment applets corresponding to a credit or a debit card for use in paying for the financial transaction, which may result in the activation command being provided to the selected payment applet. This selection may be made by activating an icon displayed on a touch-sensitive display. Alternatively or additionally, the selection may be made using a top-level button in a user interface of the electronic device. For example, the user may perform a swiping gesture in a top-level user interface in a user-interface hierarchy or tree, and then may select the payment applet from a set of possible payment applets that are displayed.

In response to the activation command, the processor may optionally receive an activation response (operation 412) from the payment applet via the interface circuit and/or the secure enclave processor.

Then, the processor may optionally request local authentication information (operation 610) specific to the electronic device based on the activation response. For example, the processor may request that a biometric sensor (such as biometric sensor 226 in FIG. 2) acquire a biometric identifier (such as a fingerprint) of the user.

In response to the request, the processor may receive the local authentication information (operation 612). For example, the local authentication information may include the biometric identifier, which is received from the biometric sensor.

Next, the processor may compare the local authentication information specific to the electronic device with stored authentication information (operation 614) using the secure enclave processor.

Moreover, the processor may provide local validation information (operation 616) specific to the electronic device to a secure element (such as secure element 230 in FIG. 2) via the secure enclave processor and/or the interface circuit if a match is obtained between the local authentication information and the stored authentication information. This communication may involve secure (encrypted) communication between the secure enclave processor and the secure element.

The local validation information may enable the payment applet to conduct the financial transaction exceeding a financial value without further validation. For example, an authentication applet (such as authentication applet 232 in FIG. 2) in the secure element may communicate the local validation information directly to the payment applet using a sharable interface object, which allows objects to be shared within the operating system of the secure element. Alternatively, in some embodiments the local validation information is used to set one of the software flags. Furthermore, as noted previously, the authentication applet may decrypt an encrypted token received from the secure enclave processor using an encryption key, and the token may include the local validation information.

After the local validation information is received, the electronic device may conduct the financial transaction (operation 422) after receiving information indicating that the electronic device is proximate to another electronic device (such as electronic device 112 in FIG. 1). In addition, the financial transaction may be conducted when the electronic device is positioned proximate to the other electronic device a single time (as opposed to requiring or involving multiple 'taps' in which the electronic device is brought proximate to or in contact with the other electronic device).

In some embodiments, the other electronic device includes a point-of-sale terminal that provides the financial value, which defines a high-valued financial transaction. Moreover, in some embodiments the local validation information is provided (operation 616) before an onset of the financial transaction. Because the financial value may not be available until the onset of the financial transaction, the authentication in the validation technique may be performed when the payment applet is activated (operation 410), so that the local validation information is available to the payment applet during the financial transaction if the financial transaction turns out to be a high-valued financial transaction based on the financial value provided by the other electronic device.

Figure 7:
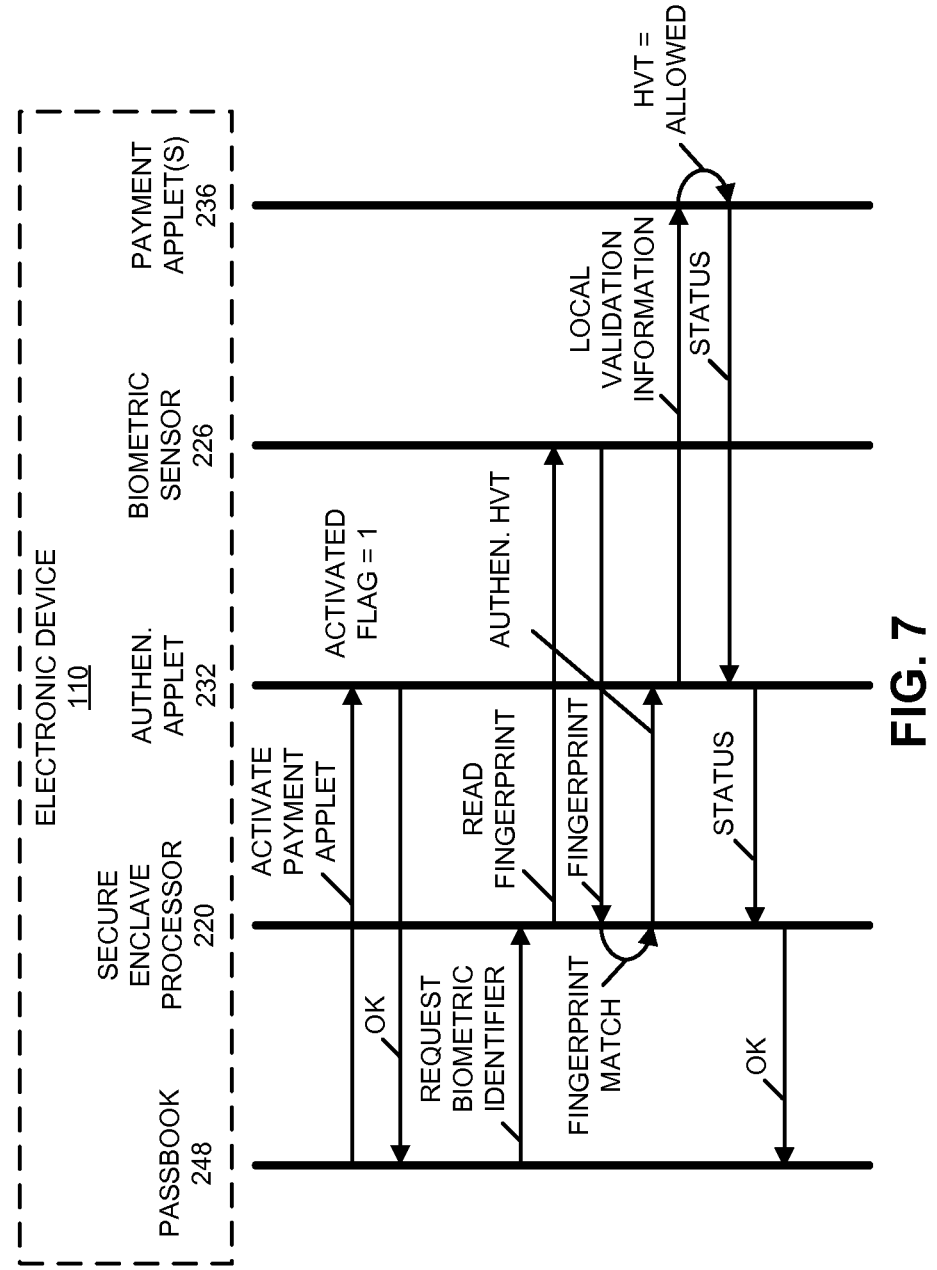
FIG. 7 is a drawing illustrating communication within one of the electronic devices in FIG. 1 and between the electronic devices of FIG. 1 in accordance with an embodiment of the present disclosure.

The handshaking in the aforementioned validation technique is illustrated in FIG. 7, which presents a drawing illustrating communication within electronic device 110 (FIG. 1) and between electronic devices 110 and 112 (FIG. 1). Note that the operations illustrated in FIG. 7 may include challenge and response operations, which are not shown for clarity. Furthermore, note that the simplified flow illustrating the conducting of the financial transaction shown in FIG. 5 is not shown in FIG. 7 for clarity.

During the communication in FIG. 7, in response to an instruction from a user of electronic device 110, passbook 248 may provide an activation command associated with a payment applet to an authentication applet 232 in secure element 230. In response, authentication applet 232 may set an activated flag and may provide an activation response associated with the payment applet to passbook 248.

Then, passbook 248 may provide a request for a biometric identifier (and, more generally, authentication information) to secure enclave processor 220, which may request that biometric sensor 226 performs a fingerprint read. After acquiring the fingerprint of the user, biometric sensor 226 provides the fingerprint to secure enclave processor 220.

Next, secure enclave processor 220 compares the fingerprint to a stored fingerprint of the user. If a match is obtained, secure enclave processor 220 provides an authentication-complete indicator to authentication applet 232, which may set an authentication flag.

Moreover, authentication applet 232 may request local validation information from one or more payment applets 236. These payment applets may response with their status to conduct a financial transaction exceeding a financial value without further validation. This status may be received by secure enclave processor 220 and, in turn, passbook 248.

Subsequently, if the payment applet is activated, the user is authenticated and the financial transaction is validated, electronic device 110 can conduct the financial transaction with the other electronic device (such as electronic device 112 in FIG. 1), e.g., via near-field communication.

In these ways, the electronic device may facilitate high-valued financial transactions between electronic devices 110 and 112 (FIGS. 1 and 2) by providing local validation of a user of electronic device 110 (FIG. 1). This validation technique may simplify the flow by reducing the number of operations the user needs to perform to complete the financial transaction. Thus, the validation technique may reduce user frustration and may improve the user experience. Consequently, the validation technique may increase commercial activity by making it safer and easier to conduct financial transactions using electronic devices and wireless communication.

In some embodiments of methods 400 (FIG. 4) and 600 (FIG. 6), there may be additional or fewer operations. For example, instead of performing operations 410 and 412 in FIGS. 4 and 6, one of the payment applets may be defined as a default payment applet for use in financial transactions, so that it is always activated unless the user selects a different payment applet. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a secure element comprising: an authentication applet and a plurality of payment applets;
   a processor, comprising a secure enclave processor configured to securely communicate with the secure element using one or more encryption keys;
   wherein the secure enclave processor is configured to:
      receive a first local authentication information specific to the electronic device, wherein the first local authentication information is associated with an activated payment applet of the plurality of payment applets;
      perform a first comparison with the first local authentication information and a first stored authentication information;
      determine that the first comparison satisfies a first match;
      in response to the first match, request second local authentication information;
      in response to the request, receive a second local authentication information specific to the electronic device;
      perform a second comparison with the second local authentication information and a second stored authentication information;
      determine that the second comparison satisfies a second match; and
      in response to the second match, provide local validation information (LVI) and an authentication-complete indicator to the authentication applet; and
   wherein the authentication applet is configured to:
      based at least on the LVI, set an LVI flag of the activated payment applet;
      based at least on the authentication-complete indicator, set a global authentication-complete flag in an operating system of the secure element that enables a subset of the plurality of payment applets; and
      request LVI from the subset of the plurality of payment applets enabled,
      wherein the secure element conducts a financial transaction without further validation with a second electronic device based at least on the LVI flag and the global authentication-complete flag, wherein the financial transaction exceeds a predetermined financial value.

2. The electronic device of claim 1, further comprising:
   an antenna; and
   an interface circuit, coupled to the antenna, the secure element and the secure enclave processor, wherein the interface circuit is configured to communicate with the second electronic device, wherein the financial transaction is conducted via wireless communication.

3. The electronic device of claim 1, further comprising a biometric sensor coupled to the secure enclave processor; wherein the second local authentication information includes a biometric identifier acquired by the biometric sensor.

4. The electronic device of claim 1, wherein the second local authentication information includes a passcode for unlocking at least some functionality of the electronic device.

5. The electronic device of claim 1, wherein the second electronic device includes a point-of-sale terminal that provides the predetermined financial value.

6. The electronic device of claim 2, wherein the second electronic device includes a point-of-sale terminal;
   wherein the wireless communication with the point-of-sale terminal is via nearfield communication; and
   wherein the financial transaction is initiated by positioning the electronic device proximate to the point-of-sale terminal.

7. The electronic device of claim 1, wherein the processor is further configured to:
   prior to the secure enclave processor performing the second comparison with the second local authentication information:
   provide an activation command to the secure element via the secure enclave processor, wherein the activated payment applet is configured to conduct the financial transaction after receiving the activation command and based at least on the LVI;
   receive an activation response from the secure element via the secure enclave processor; and
   request the second local authentication information based at least on the activation response.

8. The electronic device of claim 7, wherein the processor is further configured to:
   prior to providing the activation command, receive from a user, a selection of the activated payment applet for the financial transaction, wherein the selection is made using a top-level user interface in a user-interface hierarchy.

9. The electronic device of claim 1, wherein the authentication applet is further configured to:
   in response to the request for the LVI, receive a confirmation from the activated payment applet of the subset of the payment applets enabled.

10. The electronic device of claim 9, wherein the secure element is further configured to:
    prior to the electronic device being positioned proximate to the second electronic device, provide a confirmation that the activated payment applet of the subset of the payment applets enabled is allowed to conduct the financial transaction that exceeds the predetermined financial value, without further validation.

11. A non-transitory computer-readable storage medium storing first instructions and second instructions;
    wherein the first instructions, when executed by a secure enclave processor in a processor of an electronic device, cause the secure enclave processor to perform first operations comprising:

receiving a first local authentication information specific to the electronic device, wherein the first local authentication information is associated with an activated payment applet of a plurality of payment applets;

performing a first comparison with the first local authentication information and a first stored authentication information;

determining that the first comparison satisfies a first match;

in response to the first match, requesting second local authentication information;

in response to the requesting, receiving a second local authentication information specific to the electronic device;

performing a second comparison with the second local authentication information and a second stored authentication information;

determining that the second comparison satisfies a second match; and in response to the second match, providing local validation information (LVI) and an authentication-complete indicator to an authentication applet stored on a secure element of the electronic device; and wherein the second instructions, when executed by the secure element of the electronic device cause the authentication applet to perform second operations comprising:

based at least on the LVI, setting an LVI flag of the activated payment applet;

based at least on the authentication-complete indicator, setting a global authentication-complete flag in an operating system of the secure element that enables a subset of the plurality of payment applets; and requesting LVI from the subset of the plurality of payment applets enabled, wherein the secure element conducts a financial transaction without further validation with a second electronic device based at least on the LVI flag and the global authentication-complete flag wherein the financial transaction exceeds a predetermined financial value.

12. The non-transitory computer-readable storage medium of claim 11, wherein the second local authentication information includes a biometric identifier.

13. The non-transitory computer-readable storage medium of claim 11, wherein the second local authentication information includes a passcode for unlocking at least some functionality of the electronic device.

14. The non-transitory computer-readable storage medium of claim 11, wherein the financial transaction is conducted when the electronic device is positioned proximate to the second electronic device a single time.

15. The non-transitory computer-readable storage medium of claim 11, further storing third instructions, which when executed by the processor of the electronic device, cause the processor to perform third operations comprising:

prior to the secure enclave processor receiving the second local authentication information:

providing an activation command to the secure element via the secure enclave processor, wherein the activated payment applet is configured to conduct the financial transaction after receiving the activation command and based at least on the LVI;

receiving an activation response from the secure element via the secure enclave processor; and requesting the second local authentication information based at least on the activation response.

16. A processor-implemented method for, conducting a financial transaction at an electronic device, comprising a secure element and a secure enclave processor, with another electronic device, wherein the method comprises:

receiving, by the secure enclave processor, a first local authentication information specific to the electronic device, wherein the first local authentication information is associated with an activated payment applet of a plurality of payment applets;

performing a first comparison, by the secure enclave processor, on the first local authentication information and a first stored authentication information, determining, by the secure enclave processor, that the first comparison satisfies a first match;

in response to the first match, requesting, by the secure enclave processor, second local authentication information;

in response to the requesting, receiving, by the secure enclave processor, a second local authentication information specific to the electronic device;

performing a second comparison, by the secure enclave processor, on the second local authentication information and a second stored authentication information;

determining, by the secure enclave processor, that the second comparison satisfies a second match;

in response to the second match, providing, by the secure enclave processor, local validation information (LVI) and an authentication-complete indicator to an authentication applet stored on the secure element;

based at least on the LVI, setting, by the authentication applet, an LVI flag of the activated payment applet;

based at least on the authentication-complete indicator, setting, by the authentication applet, a global authentication-complete flag in an operating system of the secure element to enable a subset of the plurality of payment applets; and requesting, by the authentication applet, LVI from the subset of the plurality of payment applets enabled, wherein the secure element conducts a financial transaction without further validation with a second electronic device based at least on the LVI flag and the global authentication-complete flag, wherein the financial transaction exceeds a predetermined value.

17. The processor-implemented method of claim 16, further comprising:

prior to receiving the second local authentication information, providing an activation command to the secure element via a secure enclave processor, wherein the activated payment applet is configured to conduct the financial transaction after receiving the activation command and based at least on the LVI;

receiving an activation response from the secure element via the secure enclave processor; and requesting the first local authentication information based at least on the activation response.

18. The processor-implemented method of claim 16, wherein the setting the LVI flag of the activated payment applet comprises:

transmitting an encrypted token to the authentication applet, wherein the encrypted token includes the LVI.

19. The processor-implemented method of claim 18, further comprising:

decrypting, by the authentication applet, the encrypted token; and communicating, by the authentication applet, the LVI to the activated payment applet via a sharable interface object,
wherein the authentication applet executes in a master security domain and the activated payment applet executes in a supplemental security domain.

* * * * *